US008658322B2

(12) United States Patent
Kitamura

(10) Patent No.: US 8,658,322 B2
(45) Date of Patent: Feb. 25, 2014

(54) FUEL CELL SYSTEM

(75) Inventor: Nobuyuki Kitamura, Minamitsuru-gun (JP)

(73) Assignee: Toyota Jidosha Kabushiki Kaisha, Tokyo (JP)

( * ) Notice: Subject to any disclaimer, the term of this patent is extended or adjusted under 35 U.S.C. 154(b) by 1616 days.

(21) Appl. No.: 11/884,555

(22) PCT Filed: Feb. 22, 2006

(86) PCT No.: PCT/JP2006/003825
§ 371 (c)(1),
(2), (4) Date: Aug. 17, 2007

(87) PCT Pub. No.: WO2006/095606
PCT Pub. Date: Sep. 14, 2006

(65) Prior Publication Data
US 2008/0166609 A1    Jul. 10, 2008

(30) Foreign Application Priority Data
Mar. 9, 2005   (JP) ................................. 2005-065449

(51) Int. Cl.
*H01M 8/06* (2006.01)
*H01M 8/04* (2006.01)
(52) U.S. Cl.
USPC ............ 429/413; 429/409; 429/430; 429/513
(58) Field of Classification Search
USPC ................. 429/408–409, 413–414, 428–436, 429/512–513, 535
See application file for complete search history.

(56) References Cited

U.S. PATENT DOCUMENTS

| | | | | |
|---|---|---|---|---|
| 5,677,073 | A | * | 10/1997 | Kawatsu ...................... 429/442 |
| 6,376,110 | B1 | | 4/2002 | Koschany |
| 6,376,111 | B1 | * | 4/2002 | Mathias et al. ............... 429/413 |
| 6,524,733 | B1 | * | 2/2003 | Nonobe ........................ 429/413 |
| 2003/0141188 | A1 | * | 7/2003 | Imamura et al. .............. 204/424 |
| 2004/0038098 | A1 | * | 2/2004 | Imamura et al. ................ 429/25 |

(Continued)

FOREIGN PATENT DOCUMENTS

| | | | |
|---|---|---|---|
| CA | 2 326 247 | A1 | 7/2001 |
| CA | 2 286 700 | C | 12/2008 |

(Continued)

OTHER PUBLICATIONS

Partial Translation of JP 2003-086220 A.*

(Continued)

*Primary Examiner* — Barbara Gilliam
*Assistant Examiner* — Robert S Carrico
(74) *Attorney, Agent, or Firm* — Oliff PLC

(57) ABSTRACT

In a fuel cell system including a stack of polymer electrolyte fuel cells, the wet state of electrolyte membranes in the fuel cell stack is detected according to a variation in measurement value of an alternating current impedance (AC impedance) of the fuel cell stack. In an adequate level of water content of the electrolyte membranes, the measurement value of the AC impedance is substantially constant and has a very little variation. In an excess level of water content of the electrolyte membranes, the measurement value of the AC impedance has a significant variation. The AC impedance of the fuel cell stack is determinable by frequency analysis of high-frequency noise generated by an inverter included in the fuel cell system.

9 Claims, 5 Drawing Sheets

(56) References Cited

U.S. PATENT DOCUMENTS

| | | |
|---|---|---|
| 2004/0151956 A1 | 8/2004 | Orihashi et al. |
| 2004/0220752 A1 | 11/2004 | Gopal |
| 2005/0170228 A1* | 8/2005 | Tajiri et al. ............ 429/30 |
| 2006/0115699 A1* | 6/2006 | Matsuoka ............ 429/24 |

FOREIGN PATENT DOCUMENTS

| | | |
|---|---|---|
| JP | A 7-235324 | 9/1995 |
| JP | A 2002-246048 | 8/2002 |
| JP | 2002367650 A * | 12/2002 |
| JP | A-2002-367650 | 12/2002 |
| JP | A 2003-86220 | 3/2003 |
| JP | A 2003-297408 | 10/2003 |
| JP | A 2004-111196 | 4/2004 |
| JP | A 2004-241236 | 8/2004 |
| WO | WO 2004/055928 A2 | 7/2004 |
| WO | WO 2005081345 A1 * | 9/2005 |

OTHER PUBLICATIONS

Apr. 8, 2010 Search Report issued in European Patent Application No. 06714945.0.

T. Konomi et al., "Research on Diagnosis Technique on PEFC Running Condition (High Speed Analysis by FFT and Feasibility Study of Diagnosis", Transactions of the Japan Society of Mechanical Engineers, Series B. vol. 71, No. 701, Jan. 25, 2005 pp. 245-251 (with abstract).

H. Gomi, "Toka Kairo Suitei Kino o Sobi shita Nenryo Denchi Hyoka System", Denshi Zairyo, Feb. 2003, pp. 68-72.

* cited by examiner

FUEL CELL SYSTEM

TECHNICAL FIELD

The present invention relates to a fuel cell system.

BACKGROUND ART

As is known in the art with regard to polymer electrolyte fuel cells having solid polymer electrolyte membranes, the wet state of the electrolyte membranes affects the output voltage of the fuel cells. There are known techniques of measuring the AC (alternating current) impedance of fuel cells to detect the various states of the fuel cells. For example, a technique disclosed in Japanese Patent Laid-Open Gazette No. 2003-86220 measures the AC impedance (complex impedance) of fuel cells to estimate the humid state inside the fuel cells, that is, the wet state of the electrolyte membranes. These conventional techniques measure the AC impedance of the fuel cells at a preset timing and estimate the wet state of the electrolyte membranes at the preset timing.

There is a new parameter that has yet not been noted for study or examination to determine the relation between the AC impedance of fuel cells and the wet state of electrolyte membranes. The inventors of the invention have noted this new parameter and found that the wet state of electrolyte membranes in fuel cells is detectable based on measurement of the new parameter.

DISCLOSURE OF THE INVENTION

There is accordingly a need of developing a new technique of detecting the wet state of electrolyte membranes in fuel cells.

In order to satisfy at least part of the above and the other related demands, the fuel cell system of the invention has the configuration discussed below.

The invention is directed to a fuel cell system including: a fuel cell that has a solid polymer electrolyte membrane; a measurement module that measures an alternating current impedance of the fuel cell in time series; a computation module that computes a value of a preset parameter, which is related to a variation in measurement value of the alternating current impedance, from time series data of the measured alternating current impedance; and a detection module that detects a wet state of the electrolyte membrane, based on the computed value of the preset parameter.

The 'preset parameter related to the variation' is, for example, a variance, a standard deviation, or a rate of change. In an adequate wet state of the electrolyte membrane, the measurement value of the alternating current impedance is substantially constant and has a very little variation. In an inadequate wet state of the electrolyte membrane, on the other hand, the measurement value of the alternating current impedance has a significant variation. The fuel cell system of the invention can thus accurately detect the wet state of the electrolyte membrane of the fuel cell, based on the measurement of the alternating current impedance.

In one aspect of the fuel cell system of the invention, the detection module detects an excess water content of the electrolyte membrane when the computed value of the preset parameter is not less than a predetermined level.

In the excess level of the water content in the electrolyte membrane, flooding occurs inside the fuel cell to occasionally interfere with diffusion of the reactive gases. This causes a significant variation in time series data of the measured alternating current impedance. The fuel cell system of this aspect can thus detect the excess water content of the electrolyte membrane, based on a significant variation of the alternating current impedance.

In another aspect of the fuel cell system of the invention, the detection module detects the wet state of the electrolyte membrane, based on the time series data as well as the computed value of the preset parameter. The detection module detects an insufficient water content of the electrolyte membrane when the computed value of the preset parameter is less than a predetermined level and the measured alternating current impedance increases gradually.

In the insufficient level of the water content in the electrolyte membrane, there is a variation in measurement value of the alternating current impedance that is higher than a variation in the adequate level of the water content but is lower than a variation in the excess level of the water content. With a decrease in water content of the electrolyte membrane below the adequate level, the proton conductivity of the electrolyte membrane decreases and the measurement value of the alternating current impedance increases gradually. The fuel cell system of this aspect can thus detect the insufficient water content of the electrolyte membrane, based on these conditions.

In one preferable embodiment of the invention, the fuel cell system further has a water content regulation module that regulates a water content of the electrolyte membrane according to a result of the detection.

This arrangement desirably keeps the wet state of the electrolyte membrane at the adequate level.

In one aspect of the fuel cell system of this embodiment, the water content regulation module reduces the water content of the electrolyte membrane during operation stop of the fuel cell system to decrease the value of the preset parameter below the predetermined level and increase the measured alternating current impedance to a specific range that is higher than a level of the alternating current impedance in an ordinary operation state.

The operation stop of the fuel cell system with the water content remaining inside the fuel cell may freeze the fuel cell and cause difficulty in reactivation of the fuel cell. The fuel cell system of this embodiment reduces the water content of the electrolyte membrane during operation stop of the fuel cell system to make the value of the preset parameter below the predetermined level and make the measurement value of the alternating current impedance in the specific range higher than the level in the ordinary operation state. Namely the water content of the electrolyte membrane is reduced to be lower than the adequate level. This arrangement effectively prevents the fuel cell from being frozen at temperatures of below the freezing point.

In another preferable embodiment of the invention, the fuel cell system further has an output controller that controls an output of the fuel cell. The measurement module performs frequency analysis of high-frequency noise generated by the output controller to determine the alternating current impedance.

The conventional fuel cell system requires an additional device exclusively used for measurement of the alternating current impedance of fuel cells, for example, a device of applying sine wave alternating current of a predetermined frequency to the fuel cells. The requirement of the additional device undesirably causes the size expansion, the complicated structure, and the manufacturing cost increase of the fuel cell system.

The fuel cell system is generally provided with an output controller, such as an inverter. The output controller generates high-frequency noise including various frequency components. The fuel cell system of the invention performs frequency analysis of the high-frequency noise generated by the output controller to determine the alternating current impedance of the fuel cell. The fuel cell system of this arrangement does not require any additional device exclusively used for measurement of the alternating current impedance of the fuel cell but takes advantage of the existing device to determine the alternating current impedance of the fuel cell. This desirably prevents the size expansion, the complicated structure, and the manufacturing cost increase of the fuel cell system.

All the various characteristics described above are not essential for application of the present invention, but part of such characteristics may be omitted or may be combined with another part of the characteristics. The technique of the invention is not restricted to the structure of the fuel cell system but may also be actualized by a method of detecting the wet state of the electrolyte membranes in the fuel cells and a control method of the fuel cell system. The present invention is attainable by diversity of other applications. The applications of the invention include computer programs that are executed to actualize the fuel cell system and the corresponding detection and control methods, recording media that record such computer programs therein, and data signals that include such computer programs and are embodied in carrier waves. Any of the various additional arrangements described above may be adopted in any of these applications.

In the applications of the invention as the computer programs and the recording media in which the computer programs are recorded, the invention may be given as a whole program for controlling the operations of the fuel cell system or as a partial program for exerting only the characteristic functions of the invention. Available examples of the recording media include flexible disks, CD-ROMs, DVD-ROMs, magneto-optical disks, IC cards, ROM cartridges, punched cards, prints with barcodes or other codes printed thereon, internal storage devices (memories like RAMs and ROMs) and external storage devices of the computer, and diversity of other computer readable media.

BEST MODES OF CARRYING OUT THE INVENTION

One mode of carrying out the invention is described below in the following sequence as a preferred embodiment with reference to the accompanied drawings:
A. Fuel Cell System
B. Detection of Wet State of Electrolyte Membranes
C. Water Content Regulation
D. Operation Stop Process
E. Modifications

A. FUEL CELL SYSTEM

Figure 1:
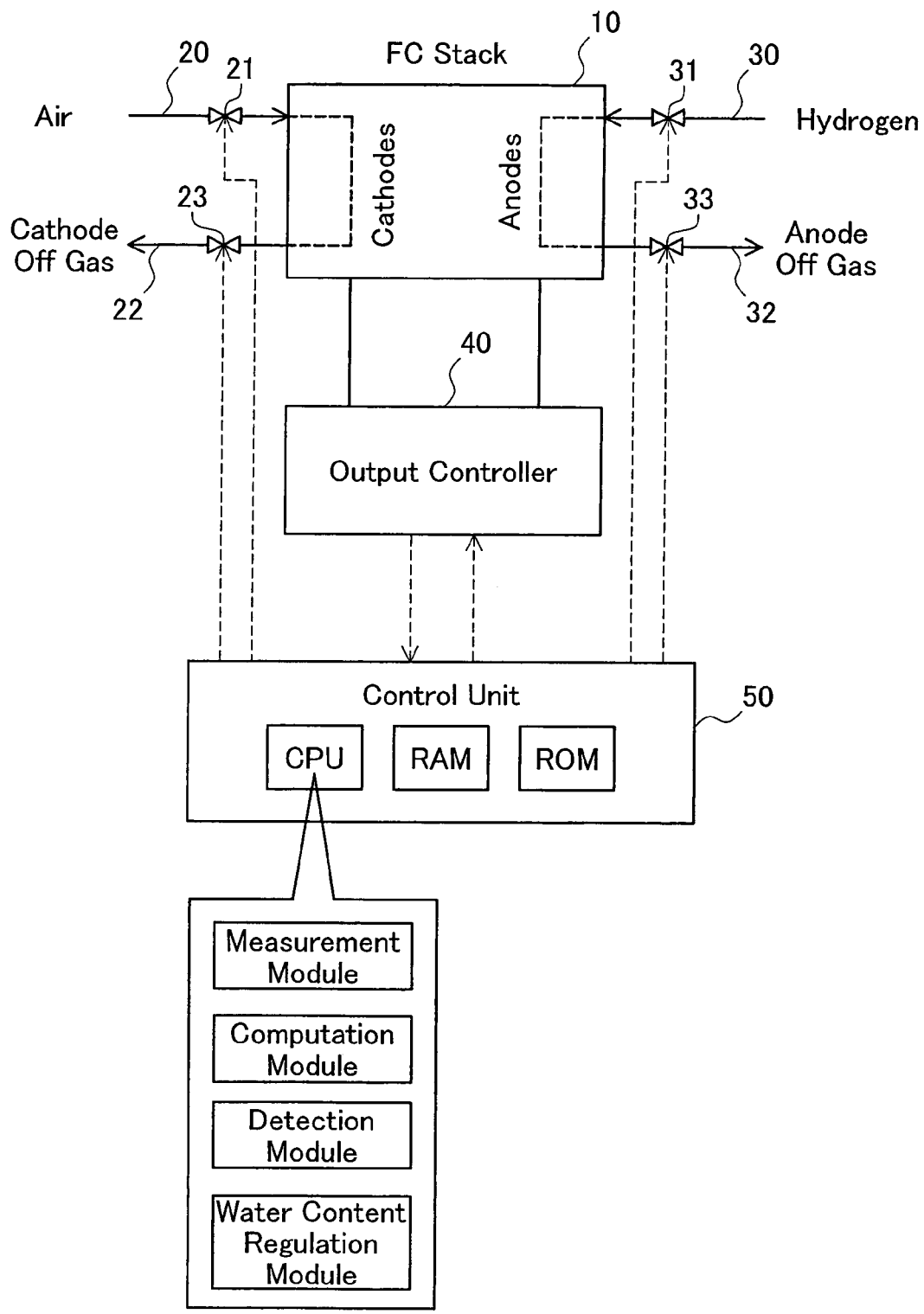
FIG. 1 schematically illustrates the structure of a fuel cell system 100 in one embodiment of the invention.

FIG. 1 schematically illustrates the structure of a fuel cell system 100 in one embodiment of the invention. The fuel cell system 100 includes a stack of fuel cells or fuel cell stack 10 and an output controller 40 controlling the output of the fuel cell stack 10.

The fuel cell stack 10 is a cell laminate of multiple unit cells that respectively generate electric power through electrochemical reaction of hydrogen with oxygen. Each unit cell (not shown) has a hydrogen electrode (anode) and an oxygen electrode (cathode) arranged across an electrolyte membrane that allows permeation of hydrogen ion. The fuel cell stack 10 consists of polymer electrolyte fuel cells having solid polymer electrolyte membranes.

A supply of the air as an oxygen-containing gas is fed through an air supply conduit 20 to the cathodes in the fuel cell stack 10. The exhaust from the cathodes (cathode off gas) flows through a cathode exhaust conduit 22 and is emitted outside. The conduits 20 and 22 are respectively equipped with valves 21 and 23.

A supply of hydrogen is fed through a hydrogen supply conduit 30 to the anodes in the fuel cell stack 10. The exhaust from the anodes (anode off gas) flows through an anode exhaust conduit 32 and is emitted outside. The conduits 30 and 32 are respectively equipped with valves 31 and 33.

The output controller 40 includes an inverter as described later and is driven in response to control signals from a control unit 50 to control the output of the fuel cell stack 10.

The fuel cell system 100 is operated under control of the control unit 50. The control unit 50 is constructed as a microcomputer internally having a CPU, a RAM, and a ROM. The control unit 50 controls the operations of the fuel cell system 100 according to a program stored in the ROM. Some examples of input and output signals into and from the control unit 50 for the system operation control are shown by the broken lines in FIG. 1. The input signals include an external output demand (not shown) and outputs from an ammeter and a voltmeter of the output controller 40. The output signals include control signals for controlling the output controller 40 and control signals for controlling the valves 21, 23, 31, and 33.

In the structure of this embodiment, the CPU of the control unit 50 executes the program to function as a measurement module, a computation module, a detection module, and a water content regulation module. The control unit 50 utilizes the outputs of the ammeter and the voltmeter of the output controller 40 to determine the AC impedance of the fuel cell stack 10. The control unit 50 detects the wet state of the electrolyte membranes in the fuel cell stack 10 according to the measurement result of the AC impedance and controls the respective constituents of the fuel cell system 100 to regulate the water content of the electrolyte membranes based on the detection result. As mentioned previously, in the structure of the embodiment, the fuel cell stack 10 has solid polymer electrolyte membranes, and the water content of the electrolyte membranes affects the power generation performance of the fuel cell stack 10. The measurement of the AC impedance and the detection of the wet state of the electrolyte membranes will be described later in detail.

Figure 2:
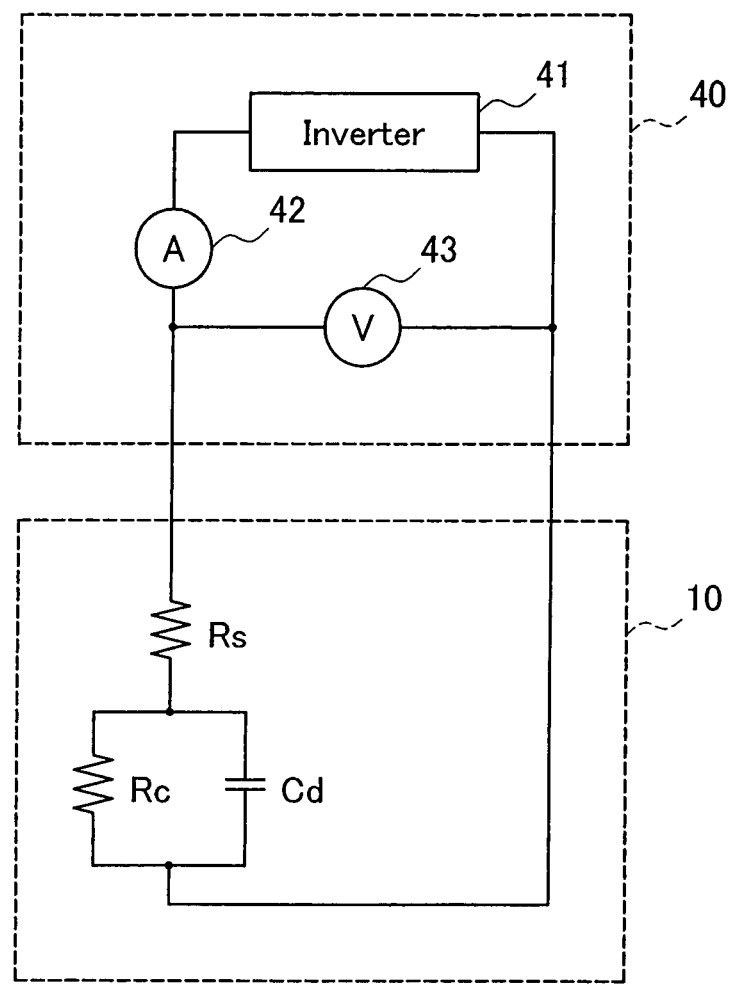
FIG. 2 is a circuit diagram showing a substantial equivalent circuit to the fuel cell system 100.

FIG. 2 is a circuit diagram showing a substantial equivalent circuit to the fuel cell system 100. As illustrated, the fuel cell stack 10 has a resistance Rs, a resistance Rc, and an electric double layer capacitance Cd. The resistance Rs includes a bulk resistance of separators in the fuel cell stack 10 and a contact resistance. The resistance Rc includes a membrane resistance and an interfacial resistance. The output controller 40 has an inverter 41, an ammeter 42, and a voltmeter 43.

The inverter 41 generates high-frequency noise including various frequency components in the course of operation of the output controller 40 for controlling the output of the fuel cell stack 10. The high-frequency noise is extractable from the outputs of the ammeter 42 and the voltmeter 43. The control unit 50 extracts the high-frequency noise from the outputs of the ammeter 42 and the voltmeter 43 and performs frequency analysis of the extracted high-frequency noise to determine the AC impedance of the fuel cell stack 10. The frequency analysis performed in this embodiment analyzes the high-frequency noise at frequencies of not lower than several hundred Hz to determine the AC impedance derived from the membrane resistance. The determination of the AC impedance according to the result of the frequency analysis is not characteristic of the present invention and is not specifically described here.

B. DETECTION OF WET STATE OF ELECTROLYTE MEMBRANES

Figure 3A:
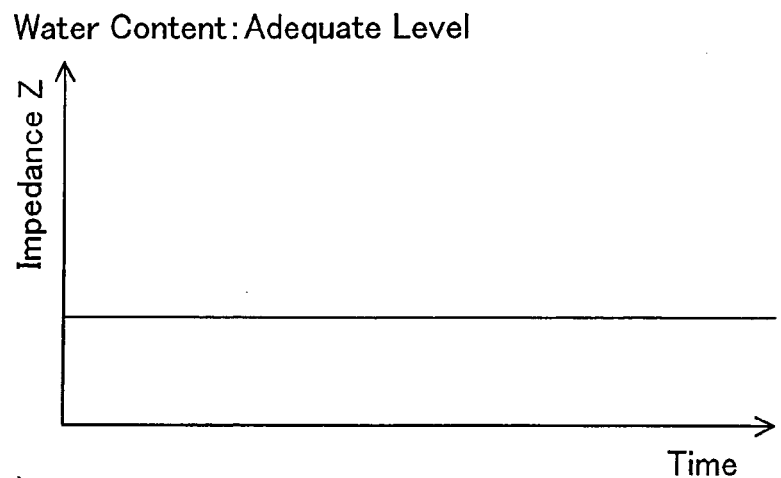
FIG. 3 shows detection of the wet state of electrolyte membranes.
Figure 3B:
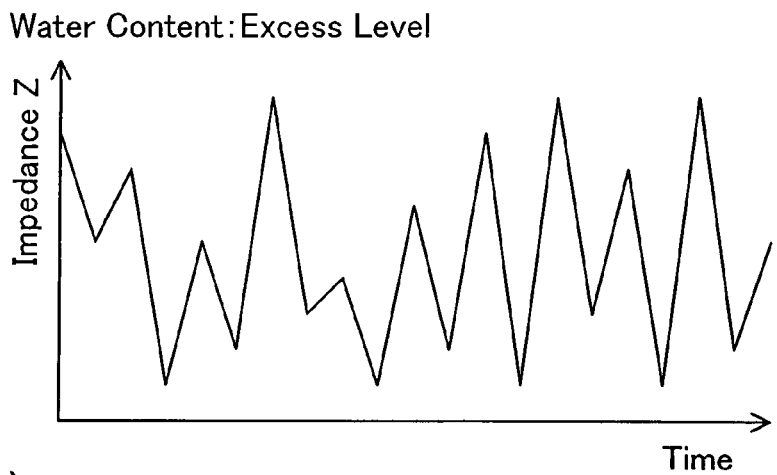
Figure 3C:
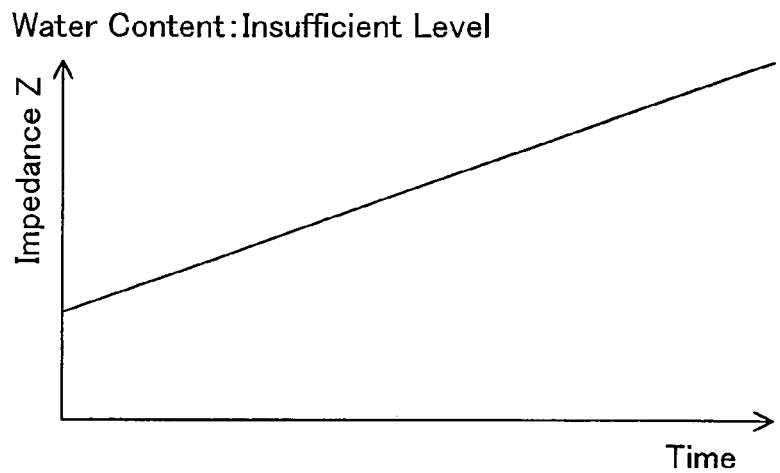

FIG. 3 shows detection of the wet state of the electrolyte membranes, based on the AC impedance of the fuel cell stack 10. The real part value of the AC impedance of the fuel cell stack 10 is used for the detection of the wet state. In the description below, the value of the AC impedance thus represents the real part value of the AC impedance.

FIG. 3(*a*) shows time series data of the AC impedance of the fuel cell stack 10 in the state of adequate water content of the electrolyte membranes. As illustrated, in the adequate level of the water content in the electrolyte membranes, the fuel cell stack 10 stably generates electric power and gives a very little variation in value of the AC impedance. Namely the adequate water content of the electrolyte membranes is detected, based on substantially constant time series values of the AC impedance in the fuel cell stack 10.

FIG. 3 (*b*) shows time series data of the AC impedance of the fuel cell stack 10 in the state of excess water content of the electrolyte membranes. As illustrated, in the excess level of the water content in the electrolyte membranes, flooding occurs inside the fuel cell stack 10 to occasionally interfere with diffusion of the reactive gases. This causes unstable power generation and a significant variation in value of the AC impedance. Namely the excess water content of the electrolyte membranes is detected, based on a significant time series variation in value of the AC impedance in the fuel cell stack 10.

FIG. 3(*c*) shows time series data of the AC impedance of the fuel cell stack 10 in the state of insufficient water content of the electrolyte membranes. As illustrated, in the insufficient level of the water content in the electrolyte membranes, there is a time series variation in value of the AC impedance that is greater than the variation in the adequate level of the water content but is smaller than the variation in the excess level of the water content. With a decrease in water content of the electrolyte membranes below the adequate level, the proton conductivity of the electrolyte membranes decreases and the measurement value of the AC impedance increases gradually. Namely the insufficient water content of the electrolyte membranes is detected, based on a time series variation in value of the AC impedance in the fuel cell stack 10 that is greater than the variation in the adequate level of the water content but is smaller than the variation in the excess level of the water content and a gradual increase in value of the AC impedance.

As described above, the wet state of the electrolyte membranes is detected, based on a time series variation in value of the AC impedance in the fuel cell stack 10. In this embodiment, a variance V is adopted as a parameter representing the variation of the AC impedance. The variance V of not higher than a first reference value V1 leads to detection of the adequate water content of the electrolyte membranes. The variance V of higher than the first reference value V1 but of lower than a second reference value V2 leads to detection of the insufficient water content of the electrolyte membranes. The variance V of not lower than the second reference value V2 leads to detection of the excess water content of the electrolyte membranes. The parameter representing the variation of the AC impedance is not restricted to the variance but may be any of other available parameters, for example, a standard deviation or a rate of change.

C. WATER CONTENT REGULATION PROCESS

Figure 4:
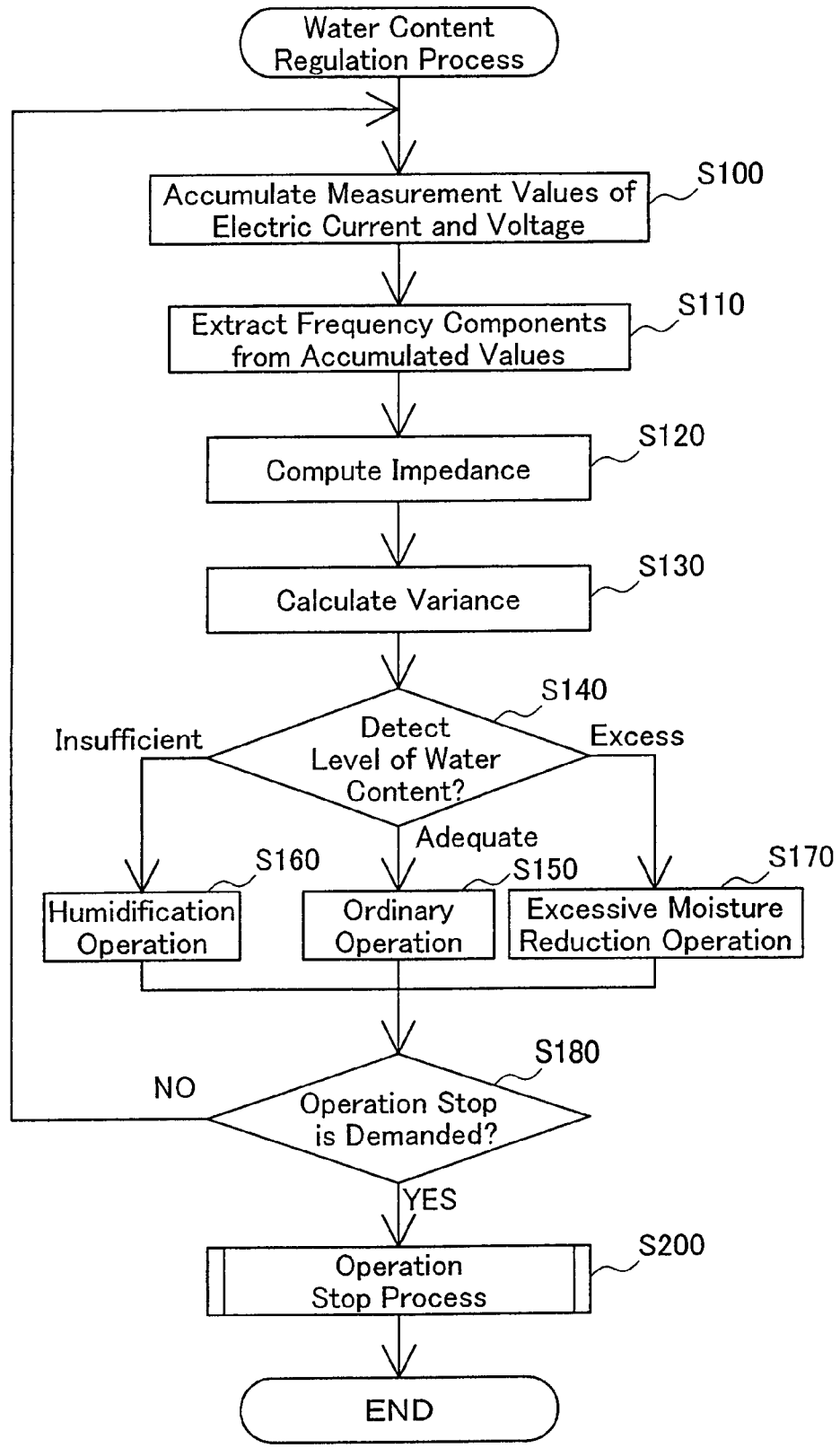
FIG. 4 is a flowchart showing a water content regulation routine.

FIG. 4 is a flowchart showing a water content regulation routine. The CPU of the control unit 50 executes this water content regulation routine during operation of the fuel cell system 100.

The CPU receives the measurement values of the electric current and the voltage output from the ammeter 42 and the voltmeter 43 of the output controller 40 at preset sampling intervals and sequentially accumulates the received measurement values into the RAM (step S100). The sampling interval may be set arbitrarily. As mentioned previously, the measurement values of the electric current and the voltage include high-frequency noise. The CPU extracts frequency components from the accumulated values of the electric current and the voltage by fast Fourier transform (step S110) and computes an AC impedance of the fuel cell stack 10 (step S120). The computed value of the AC impedance is also accumulated into the RAM. The CPU subsequently calculates a variance of the computed values of the AC impedance (step S130). The number of the computed values of the AC impedance as the calculation subjects of the variance, that is, a time range as the calculation object of the variance, may be set arbitrarily.

The CPU then detects the water content of the electrolyte membranes in the fuel cell stack 10, based on the calculated variance (step S140). As described above, the adequate level of the water content of the electrolyte membranes is detected in response to the variance V of not higher than the first reference value V1. The insufficient level of the water content of the electrolyte membranes is detected in response to the variance V of higher than the first reference value V1 but of lower than the second reference value V2. The excess level of the water content of the electrolyte membranes is detected in response to the variance V of not lower than the second reference value V2. The insufficient level of the water content of the electrolyte membranes is detectable with a higher accuracy, based on a gradual increase in measurement value of the AC impedance as well as the variance V of higher than the first reference value V1 and of lower than the second reference value V2. This is because the value of the AC impedance gradually increases with a decrease in water content of the electrolyte membranes as described previously.

In response to detection of the adequate water content of the electrolyte membranes at step S140, the CPU performs ordinary operation (step S150). In response to detection of the insufficient water content of the electrolyte membranes at step S140, the CPU performs humidification operation (step S160). The humidification operation regulates the temperature of the fuel cell stack 10, the pressures and the flow rates of the reactive gasses supplied to the fuel cell stack 10, and the amount of humidification by a humidifier (not shown) to increase the water content of the electrolyte membranes. In response to detection of the excess water content of the electrolyte membranes at step S140, on the other hand, the CPU performs excessive moisture reduction operation (step S170). The excessive moisture reduction operation regulates the temperature of the fuel cell stack 10, the pressures and the flow rates of the reactive gasses supplied to the fuel cell stack 10, and the amount of humidification by the humidifier (not shown) to decrease the water content of the electrolyte membranes.

The CPU then determines whether the operation of the fuel cell system 100 is to be stopped, that is, whether an operation stop demand is input (step S180). In the case of no demand for operation stop of the fuel cell system 100 (step S180: no), the water content regulation routine goes back to step S100. In the case of a demand for operation stop of the fuel cell system 100 (step S180: yes), on the other hand, the water content regulation routine performs an operation stop process (step S200) described below and is terminated.

D. OPERATION STOP PROCESS

Figure 5:
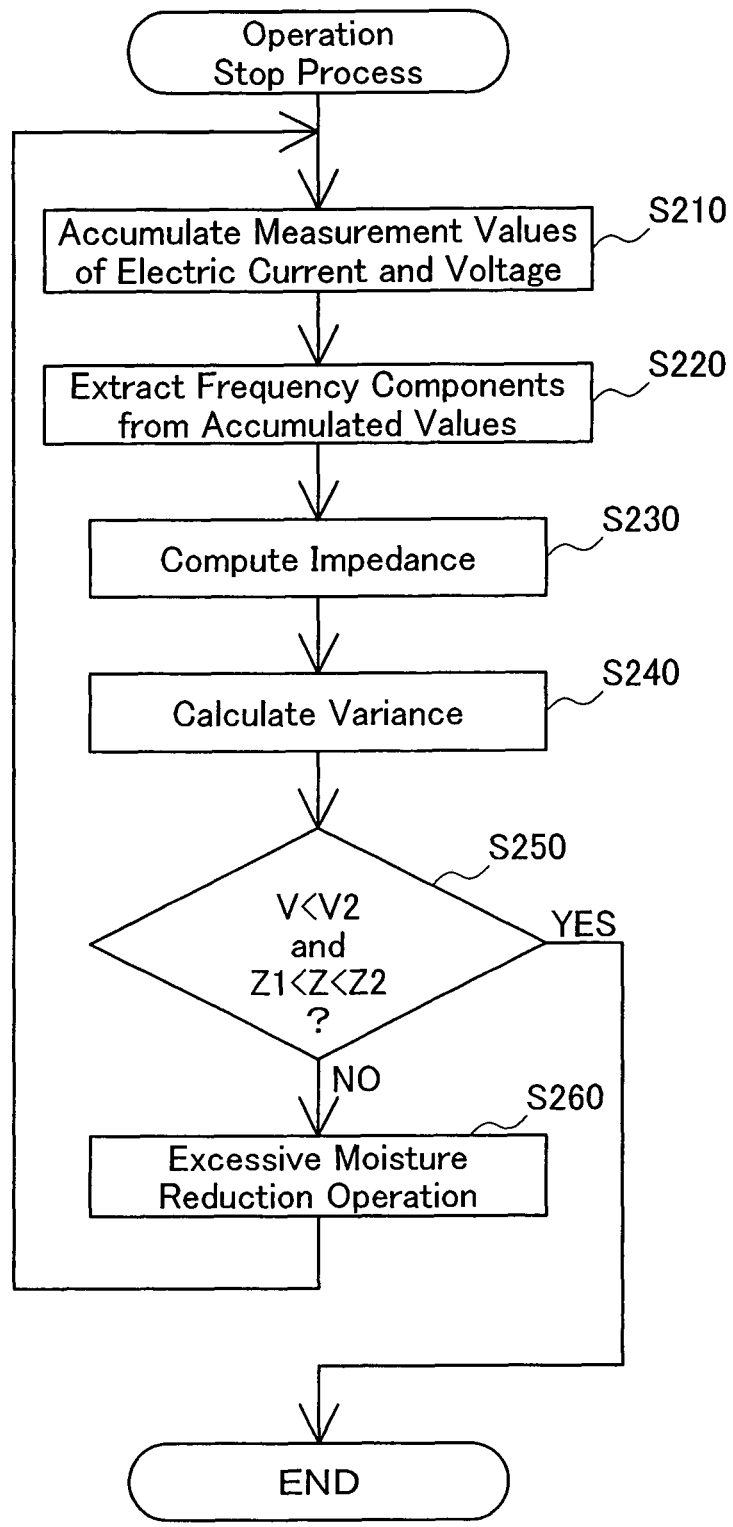
FIG. 5 is a flowchart showing the details of an operation stop process.

FIG. 5 is a flowchart showing the details of the operation stop process performed at step S200 in the water content regulation routine of FIG. 4. The operation stop process is executed to prevent the fuel cell stack 10 from being frozen at temperatures of below the freezing point after stop of the operation of the fuel cell system 100.

The processing of steps S210 through S240 in the operation stop process of FIG. 5 is identical with the processing of steps S100 through S130 in the water content regulation routine of FIG. 4 and is continuously executed. The CPU receives the measurement values of the electric current and the voltage output from the ammeter 42 and the voltmeter 43 of the output controller 40 at the preset sampling intervals and sequentially accumulates the received measurement values into the RAM (step S210). The CPU extracts the frequency components from the accumulated values of the electric current and the voltage by fast Fourier transform (step S220), computes an AC impedance Z of the fuel cell stack 10 (step S230), and calculates a variance V of the computed value of the AC impedance Z (step S240).

The CPU then determines whether the calculated variance V and the computed AC impedance Z satisfy predetermined conditions, that is, whether the variance V is lower than a preset reference value V2 and the latest computed value of the AC impedance Z is in a preset range between a lower limit Z1 and an upper limit Z2 (step S250). The reference value V2 is set as a criterion for detecting the excess water content of the electrolyte membranes. The lower limit Z1 and the upper limit Z2 are set to define a region of the insufficient water content of the electrolyte membranes and a specific range of ensuring quick activation of the fuel cell stack 10 with preventing the fuel cell stack 10 from being frozen at temperatures of below the freezing point. When either of the variance V and the AC impedance Z fails to satisfy the above conditions (step S250: no), the CPU continuously performs an excessive moisture reduction operation (step S260) until satisfaction of the above conditions. The excessive moisture reduction operation of step S260 is identical with the excessive moisture reduction operation of step S170 in the flowchart of FIG. 4. When both the variance V and the AC impedance Z satisfy the above conditions (step S250: yes), on the other hand, the CPU terminates the operation stop process.

As described above, the fuel cell system 100 of the embodiment effectively detects the wet state of the electrolyte membranes, based on the variation in value of the AC impedance in the fuel cell stack 10. The operation of the fuel cell system 100 is controlled to keep the wet state of the electrolyte membranes at the adequate level.

The fuel cell system 100 of the embodiment performs the frequency analysis of the high-frequency noise generated by the output controller 40 to determine the AC impedance of the fuel cell stack 10. The arrangement of the embodiment does not require any additional device exclusively used for measurement of the AC impedance of the fuel cell stack 100 but takes advantage of the existing device to determine the AC impedance of the fuel cell stack 100. This desirably prevents the size expansion, the complicated structure, and the manufacturing cost increase of the fuel cell system 100.

E. MODIFICATIONS

The embodiment discussed above is to be considered in all aspects as illustrative and not restrictive. There may be many modifications, changes, and alterations without departing from the scope or spirit of the main characteristics of the present invention. Some examples of possible modification are given below.

E1. Modified Example 1

The fuel cell system 100 of the embodiment performs the frequency analysis of the high-frequency noise generated by the inverter 41 to determine the AC impedance of the fuel cell stack 10. When the high-frequency noise has a low amplitude and causes a poor measurement accuracy of the AC impedance, one adoptable measure applies a voltage having an arbitrary frequency component to a command voltage of the inverter 41 to increase the amplitude of the high-frequency noise and improve the measurement accuracy of the AC impedance.

E2. Modified Example 2

The fuel cell system 100 of the embodiment measures the AC impedance of the whole fuel cell stack 10. This is, however, not essential. One possible modification may provide a measurement terminal on each separator in the fuel cell stack 10 to measure the AC impedance of each unit cell. This arrangement effectively identifies the location of a failure occurring in the fuel cell stack 10.

The invention claimed is:

1. A fuel cell system, comprising:
   a fuel cell that has a solid polymer electrolyte membrane;
   a measurement module configured to measure values of an alternating current impedance of the fuel cell in time series while the fuel cell system is in operation;
   a computation module configured to compute a variance from the measured values of the alternating current impedance; and
   a detection module configured to detect a wet state of the electrolyte membrane, based on the variance.

2. The fuel cell system in accordance with claim 1, wherein the detection module detects an excess water content of the electrolyte membrane when the computed variance is not less than a predetermined level.

3. The fuel cell system in accordance with claim 1, wherein the detection module is configured to detect the wet state of the electrolyte membrane, based on the time series of the measured alternating current impedance as well as the computed variance, and
   the detection module is configured to detect an insufficient water content of the electrolyte membrane when the computed variance is less than a predetermined level and the measured alternating current impedance increases.

4. The fuel cell system in accordance with claim 1, the fuel cell system further having:

a water content regulation module configured to regulate a water content of the electrolyte membrane according to a result of the detection.

5. The fuel cell system in accordance with claim 4, wherein the water content regulation module reduces the water content of the electrolyte membrane during operation stop of the fuel cell system to decrease the variance below the predetermined level and increase the measured alternating current impedance to a specific range that is higher than a level of the alternating current impedance in an ordinary operation state.

6. The fuel cell system in accordance with claim 1, the fuel cell system further having:
    an output controller configured to control an output of the fuel cell,
    wherein the measurement module performs frequency analysis of high-frequency noise generated by the output controller to determine the alternating current impedance.

7. A detection method applied to a fuel cell having a solid polymer electrolyte membrane to detect a wet state of the electrolyte membrane, the detection method comprising:
    (a) measuring values of an alternating current impedance of the fuel cell in time series while the fuel cell is in operation;
    (b) computing a variance from the measured values of the alternating current impedance; and
    (c) detecting the wet state of the electrolyte membrane, based on the variance.

8. A control method of a fuel cell system that includes a fuel cell having a solid polymer electrolyte membrane, the control method comprising:
    (a) measuring values of an alternating current impedance of the fuel cell in time series while the fuel cell system is in operation;
    (b) computing a variance from the measured values of the alternating current impedance;
    (c) detecting a wet state of the electrolyte membrane, based on the variance; and
    (d) regulating a water content of the electrolyte membrane according to a result of the detection.

9. The control method of the fuel cell system in accordance with claim 8, wherein the fuel cell system further includes an output controller configured to control an output of the fuel cell, and
    the measuring step (a) performs frequency analysis of high-frequency noise generated by the output controller to determine the alternating current impedance.

* * * * *